(12) United States Patent
Li et al.

(10) Patent No.: US 11,883,340 B2
(45) Date of Patent: Jan. 30, 2024

(54) MECHANICAL TYPE LIFTING SHIFTER

(71) Applicants: Shenzhen Maikangxin Medical Robot Co., Ltd., Guangdong (CN); Qian Li, Guangdong (CN)

(72) Inventors: Qian Li, Guangdong (CN); Xuehai Zhang, Guangdong (CN)

(*) Notice: Subject to any disclaimer, the term of this patent is extended or adjusted under 35 U.S.C. 154(b) by 232 days.

(21) Appl. No.: 17/615,837

(22) PCT Filed: May 29, 2020

(86) PCT No.: PCT/CN2020/093468
§ 371 (c)(1),
(2) Date: Dec. 2, 2021

(87) PCT Pub. No.: WO2021/082431
PCT Pub. Date: May 6, 2021

(65) Prior Publication Data
US 2022/0313511 A1 Oct. 6, 2022

(30) Foreign Application Priority Data
Oct. 30, 2019 (CN) .......................... 201911044577.1

(51) Int. Cl.
*A61G 5/10* (2006.01)
*F16H 37/12* (2006.01)
(52) U.S. Cl.
CPC ........... *A61G 5/104* (2013.01); *F16H 37/124* (2013.01)

(58) Field of Classification Search
CPC .............................. A61G 5/104; F16H 37/124
See application file for complete search history.

(56) References Cited

U.S. PATENT DOCUMENTS

| 5,653,301 A * | 8/1997 | Andre ................... A61G 5/061 180/8.5 |
| 2007/0096525 A1* | 5/2007 | McElhinney .......... A61G 5/104 297/339 |

FOREIGN PATENT DOCUMENTS

CN 201216702 Y * 4/2009

* cited by examiner

*Primary Examiner* — Anthony D Barfield

(57) ABSTRACT

A mechanical type lifting shifter provided below a wheelchair body, including a bottom supporting assembly having a pair of oppositely arranged supporting members and gear rack columns provided on the supporting members; a movable upper supporting assembly having movable supporting members slidably sleeving the gear rack columns; a gear roller assembly having a rotating shaft and a pair of lifting gears provided on the two end portions of the rotating shaft; two ends of the rotating shaft are respectively and fixedly connected to a pair of movable supporting members and support the movable supporting members, and the lifting gears are engaged with the gear rack columns; a pedal transmission assembly mounted on the rotating shaft and in transmission connection with the rotating shaft; and a pedal clutch assembly connected to the pedal transmission assembly to switch clockwise and anti-clockwise motion transmission between the pedal transmission assembly and the rotating shaft.

10 Claims, 7 Drawing Sheets

MECHANICAL TYPE LIFTING SHIFTER

BACKGROUND OF THE INVENTION

The present invention relates to the technical field of wheelchairs and more particularly a mechanical type lifting shifter.

Wheelchair is an important tool for rehabilitation, which is not only a transportation tool for people with physical disabilities, but more importantly, using a wheelchair enables them to conduct physical exercise and participate in social activities. As illustrated in FIG. 1, a conventional wheelchair 100 cannot perform lifting. However, most equipment in the market serving the elderly with mobility impairments and people with physical disabilities has monotonic function with a limited scope of simple applications, including shifting, transporting, bathing or defecating. Notably, there are still problems regarding the mutual transfer of a person between wheelchairs and sofas, beds, toilet pans or seats, as is known to all, there is no uniformed standard height for sofas, seats and beds in the market, but traditional shifters (wheelchairs) are only provided with fixed height which is difficult to match the height of the sofas, beds, and toilet pans, causing inconvenience in nursing and requiring caregivers to shift, lift, or embrace a person in order to move the person.

In summary, the existing wheelchair obviously contains inconveniences and shortcomings in actual use, and is thus necessary to be improved.

BRIEF SUMMARY OF THE INVENTION

In view of the aforementioned shortcomings, it is an object of the present invention to provide a mechanical type lifting shifter that enables the height of a wheelchair to be vertically adjusted.

To attain the object of the present invention, the present invention provides a mechanical type lifting shifter arranged below a wheelchair body, comprising:
- a bottom supporting assembly, arranged below the wheelchair body, comprising a pair of oppositely arranged supporting members, and gear rack columns vertically arranged respectively on the supporting members;
- a movable upper supporting assembly, comprising a pair of movable supporting members; the movable supporting members slidably sleeve the gear rack columns respectively;
- a gear roller assembly, comprising a rotating shaft and a pair of lifting gears respectively arranged on two end portions of the rotating shaft; two ends of the rotating shaft are fixedly connected to and supporting the pair of movable supporting members respectively; the lifting gears 22 are engageably connected to the gear rack columns respectively;
- a pedal transmission assembly, arranged on the rotating shaft and rotatably connected to the rotating shaft to achieve motion transmission;
- a pedal clutch assembly, connected to the pedal transmission assembly to switch a clockwise and anti-clockwise rotational transmission between the pedal transmission assembly and the rotating shaft.

According to the mechanical type lifting shifter of the present invention, the pedal transmission assembly comprises:
- a worm-and-gear assembly, comprising a worm and a worm wheel; an end portion of the worm is in transmission connection with the worm wheel, and the worm wheel is in transmission connection with the rotating shaft;
- a bevel gear assembly, comprising a pair of large bevel gears facing towards each other and a small bevel gear in a size smaller than the large bevel gears arranged between the pair of large bevel gears and meshed with the large bevel gears; the small bevel gear is arranged on another end portion of the worm of the worm-and-gear assembly via a first limit key;
- a pedal ratchet assembly, comprising a first pedal, a ratchet pin, a pedal ratchet and a linkage shaft; the linkage shaft penetrates a central axis of the pair of large bevel gears, and rotations of the linkage shaft and the large bevel gears are independent from each other; the pedal ratchet is fixed on the linkage shaft between the pair of large bevel gears by the ratchet pin; the first pedal is in transmission connection with the pedal ratchet to transmit motion to the pedal ratchet to drive the linkage shaft to rotate;

The pedal clutch assembly comprises a second pedal and a pair of connecting mechanisms; each of the pair of connecting mechanisms is arranged on a side of a corresponding large bevel gear; the pair of connecting mechanisms is fixed on the linkage shaft via a second limit key; the second pedal is in transmission connection with the pair of connecting mechanisms; when stepping on or resetting the second pedal, one of the connecting mechanisms on one side is driven to be fixed to the corresponding large bevel gear on the same side, while another one of the connecting mechanisms on another side is disconnected from the corresponding large bevel gear on said another side.

According to the above mechanical type lifting shifter, the pair of connecting mechanisms each comprises a rotating plate, at least a pair of first steel balls, a roller bearing, and a connecting plate, provided on a side of a corresponding large bevel gear; wherein the second pedal is in transmission connection with the rotating plate, and at least a pair of steel ball grooves is provided on the rotating plate; the steel ball grooves on the rotating plate on a side of a corresponding large bevel gear and the steel ball grooves on the rotating plate on a side of another large bevel gear are distributed in mutually staggered positions; the rotating plate is arranged between the first steel balls and the roller bearing, and the connecting plate is arranged between the roller bearing and the large bevel gear; the second pedal drives both rotating plates of the pair of connecting mechanisms to rotate so that the first steel balls of one of the connecting mechanisms slide into the corresponding steel ball grooves on the rotating plate of said one of the connecting mechanisms and the first steel balls of another one of the connecting mechanisms slide out of the corresponding steel ball grooves on the rotating plate of said another one of the connecting mechanisms; the first steel balls sliding out of the corresponding steel ball grooves abut against the corresponding rotating plate to push the corresponding connecting plate to fixedly connects with a corresponding large bevel gear of the same side, and the connecting plate is coaxially connected and fixed with the linkage shaft to drive the corresponding large bevel gear to rotate with the linkage shaft.

According to the above mechanical type lifting shifter, the connecting plate is provided with a first toothed profile on an end surface facing to the corresponding large bevel gear of the same side; a corresponding end surface of the large bevel gear of the same side is provided with a corresponding second toothed profile; the connecting plate and the corresponding large bevel gear of the same side are engageably connected by the first toothed profile and the second toothed profile, so that the connecting plate is fixedly connected with the corresponding large bevel gear of the same side; at least one reset spring is provided on the end surface of the large bevel gear connected with the connecting plate.

According to the above mechanical type lifting shifter, a transmission ratio between the worm wheel and the worm is 1:20, a reference diameter of a gear rack of each gear rack column is 30 mm, and a module is two.

According to the above mechanical type lifting shifter, the pedal ratchet is locked on the linkage shaft by a circlip.

According to the above mechanical type lifting shifter, the two lifting gears are respectively fixedly arranged on the rotating shaft via a third limit key, and operate synchronously with the worm wheel.

According to the above mechanical type lifting shifter, the first pedal and the second pedal are respectively provided with a reset rotation mechanism.

According to the above mechanical type lifting shifter, a top portion of each supporting member is provided with a first sliding groove, and a lower end portion of each gear rack column is fixed within the corresponding first sliding groove; at least one second sliding groove is defined above each gear rack column upon sleeving of the gear rack column by the corresponding movable supporting member, and a plurality of second steel balls are provided within each second sliding groove; each of the movable supporting members sleeves the corresponding gear rack column, and an inner wall of each movable supporting member abuts against the corresponding second steel balls.

According to the above mechanical type lifting shifter, the supporting members are in a rectangular cuboidal shape, and rollers are arranged on bottom sides of two end portions of the supporting member; and the two supporting members are arranged in parallel.

The present invention provides a mechanical type lifting shifter arranged below a wheelchair body, comprising: a bottom supporting assembly arranged below the wheelchair body comprising a pair of oppositely arranged supporting members and gear rack columns vertically arranged on the supporting members respectively; a movable upper supporting assembly comprising a pair of movable supporting members slidably sleeving the gear rack columns respectively; a gear roller assembly, comprising a rotating shaft and a pair of lifting gears respectively arranged on two end portions of the rotating shaft; two ends of the rotating shaft are respectively fixedly connected to and supporting the pair of movable supporting members; the lifting gears are engageably connected to the gear rack columns respectively; a pedal transmission assembly, arranged on the rotating shaft and rotatably connected to the rotating shaft; a pedal clutch assembly, connected to the pedal transmission assembly to switch the clockwise and anti-clockwise motion transmission between the pedal transmission assembly and the rotating shaft. Therefore, the present invention solves the problem concerning the degree of ascending and descending caused by an insufficient height of a lifting machine; the present invention is simple in structure, and achieves lifting automation.

DETAILED DESCRIPTION OF THE INVENTION

Figure 1:
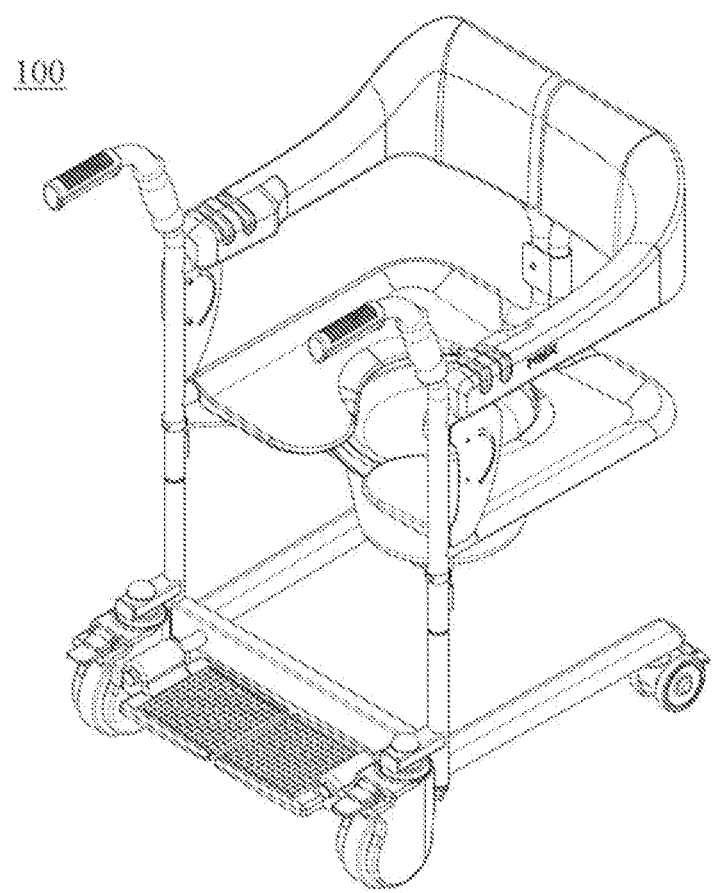
FIG. 1 shows a schematic diagram of a wheelchair provided by existing technology.
Figure 2:
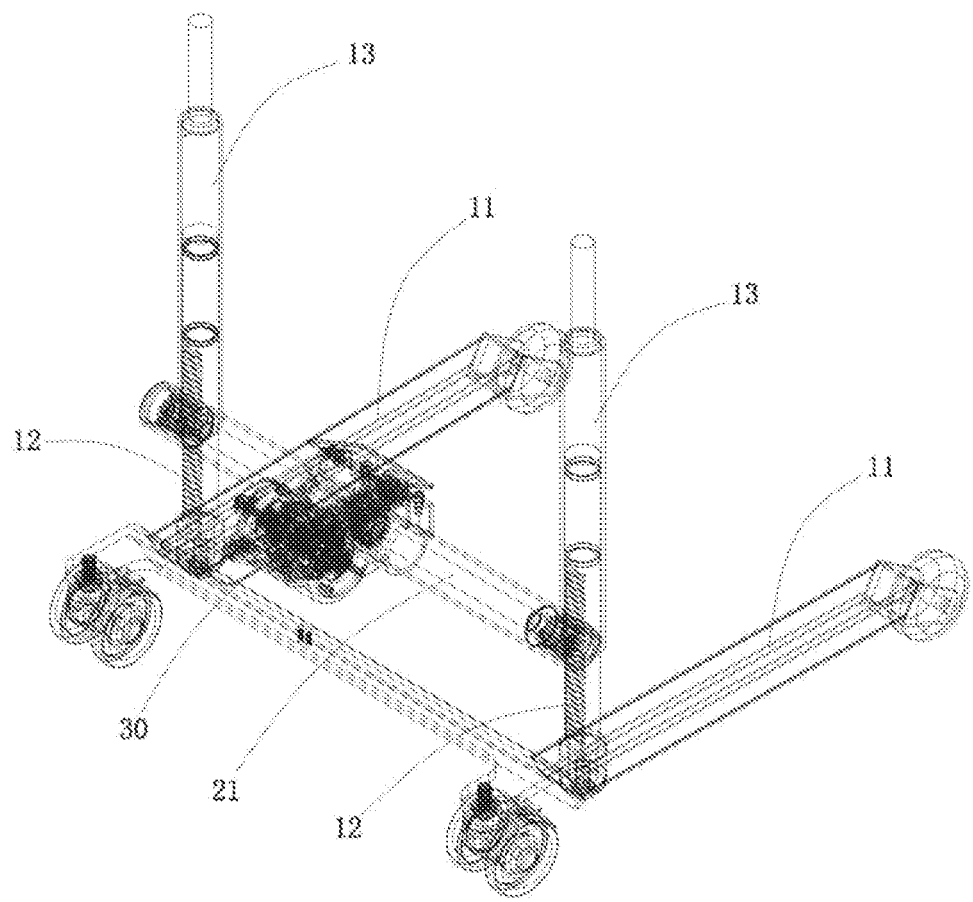
FIG. 2 shows a perspective view of the mechanical type lifting shifter in the preferred embodiment of the present invention.
Figure 3:
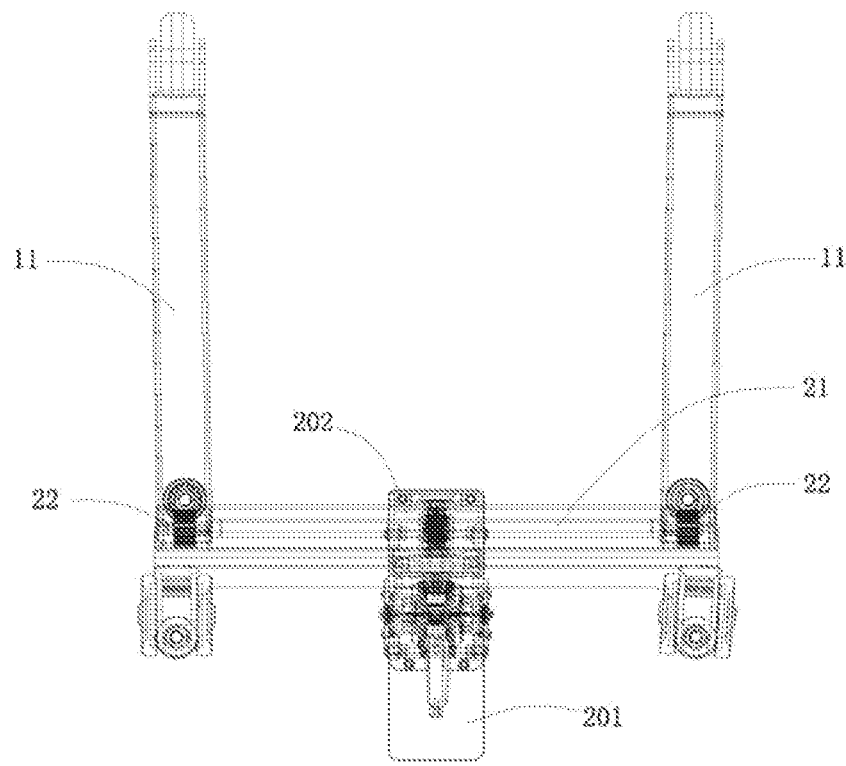
FIG. 3 shows a top view of the mechanical type lifting shifter in the preferred embodiment of the present invention.
Figure 4:
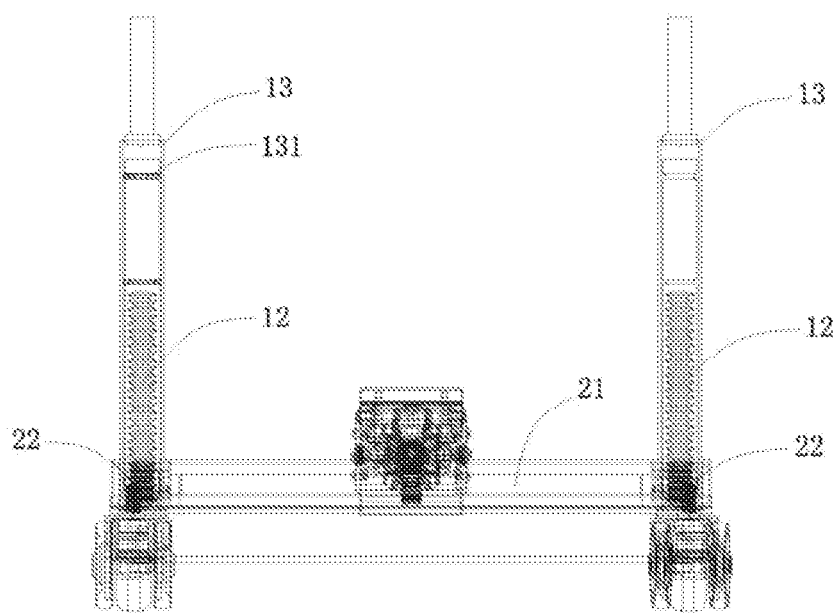
FIG. 4 shows a front view of the mechanical type lifting shifter in the preferred embodiment of the present invention.
Figure 5:
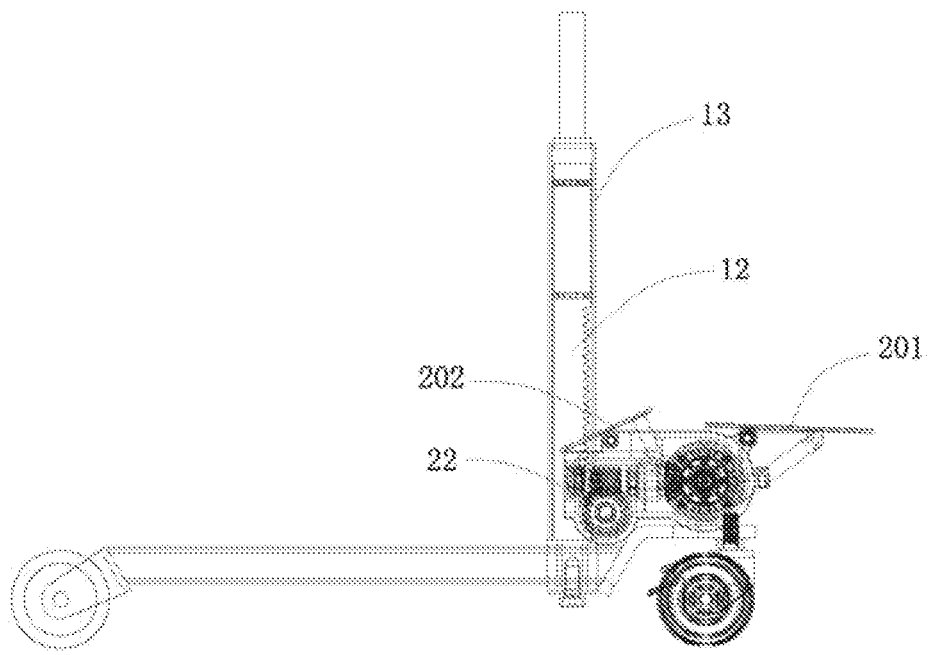
FIG. 5 shows a side view of the mechanical type lifting shifter descended to the lowest position in the preferred embodiment of the present invention.
Figure 6:
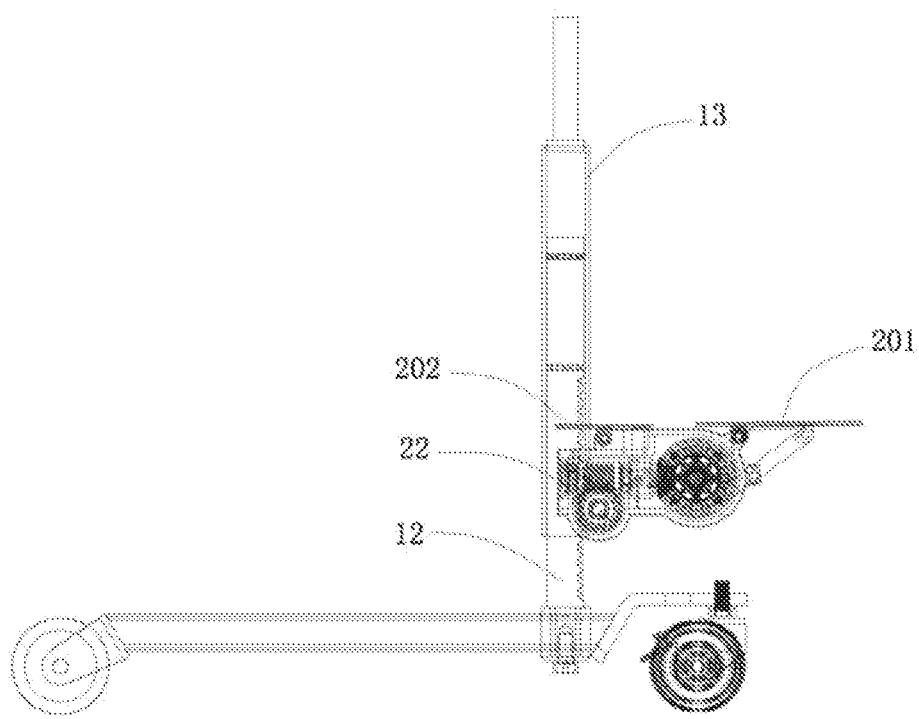
FIG. 6 shows a side view of the mechanical type lifting shifter in a rising state in the preferred embodiment of the present invention.
Figure 7:
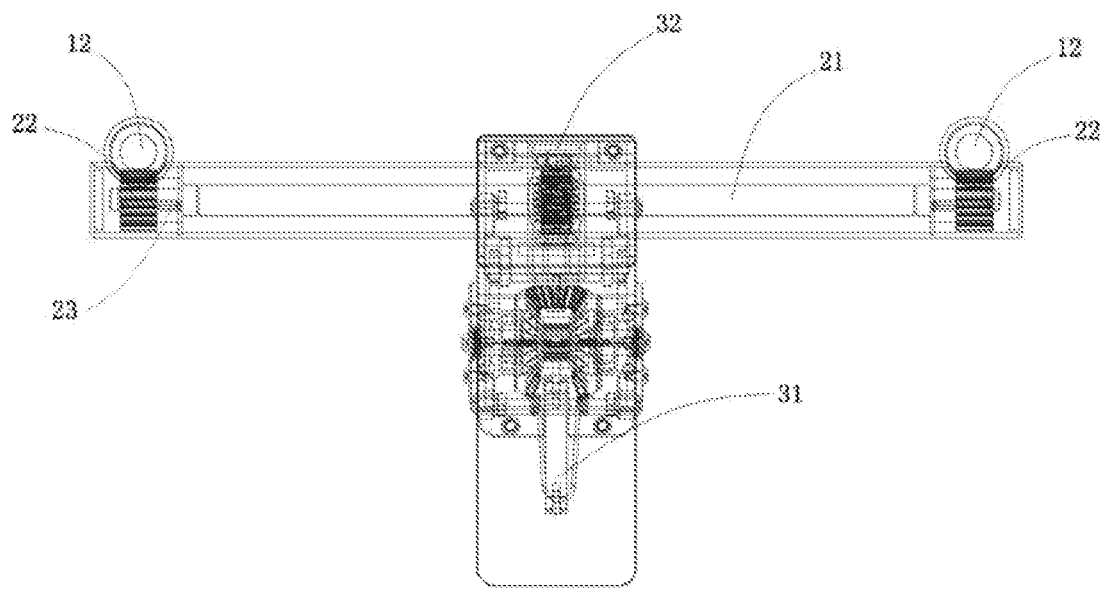
FIG. 7 shows a top view of a gear roller assembly, a pedal transmission assembly, and a pedal clutch assembly of the mechanical type lifting shifter in the preferred embodiment of the present invention.

To better clarify the purposes, technical solutions and advantages of the present invention, the following will further describe in detail the present invention with reference to the accompanying drawings and embodiments. It should be understood that the specific embodiments described here are only intended to explain the present invention, but not to limit the present invention.

As illustrated in FIGS. 2-11, the mechanical type lifting shifter in a preferred embodiment of the present invention is arranged below a wheelchair body, comprising:

a bottom supporting assembly, arranged below the wheelchair body, comprising a pair of oppositely arranged supporting members 11, and gear rack columns 12 vertically arranged respectively on the supporting members 11;

a movable upper supporting assembly, comprising a pair of movable supporting members 13; the movable supporting members 13 slidably sleeve the gear rack columns 12 respectively;

a gear roller assembly, comprising a rotating shaft 21 and a pair of lifting gears 22 respectively arranged on two end portions of the rotating shaft 21; two ends of the rotating shaft 21 are fixedly connected to and supporting the pair of movable supporting members 13 respectively; the lifting gears 22 are engageably connected to the gear rack columns 12 respectively;

a pedal transmission assembly 31, arranged on the rotating shaft 21 and rotatably connected to the rotating shaft 21;

a pedal clutch assembly 32, connected to the pedal transmission assembly 31 to switch a clockwise and anti-clockwise rotational transmission between the pedal transmission assembly 31 and the rotating shaft 21.

The pedal transmission assembly 31 and the pedal clutch assembly 32 in the present embodiment form an integral device 30, and are arranged on a center part of the rotating shaft 21, the rotating shaft 21 is arranged horizontally between the pair of gear rack columns 12, and the lifting gears 22 at the two end portions of the rotating shaft 21 are respectively engageably connected to the gear rack columns 12; clockwise or anti-clockwise rotation of the rotating shaft 21 is driven by the pedal transmission assembly 31, so that the lifting gears 22 climb up or down along the gear rack columns 12; the pedal clutch assembly 32 switches the clockwise and anti-clockwise rotational transmission between the pedal transmission assembly 31 and the rotating shaft 21; the pedal transmission assembly 31 drives the rotating shaft 21 to rotate clockwise or anti-clockwise, and the lifting gears 22 follow the clockwise or anti-clockwise rotation of the rotating shaft 21 to climb up or down on the gear rack columns 12; the rotating shaft 21 and the lifting gears 22 carry the movable supporting members 13 up or down, and the movable supporting members 13 driven up or down will drive the wheelchair body to move up or down, specifically to drive a chair seat of the wheelchair body to move up or down; the wheelchair body comprises a chair seat, handles and a chair back etc.

Figure 8:
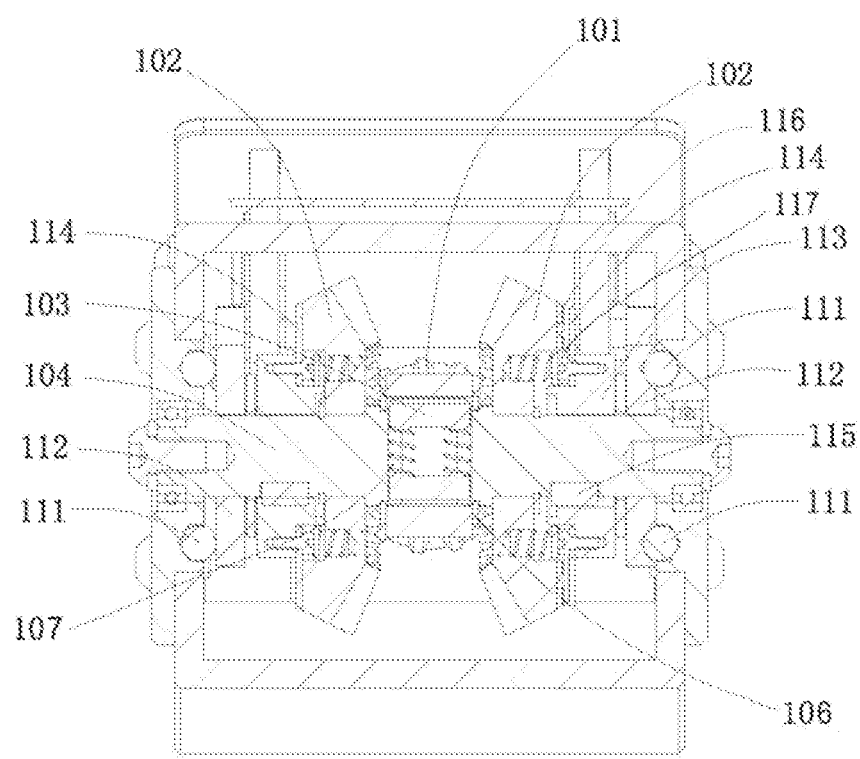
FIG. 8 shows a front sectional view of the pedal transmission assembly and the pedal clutch assembly of the mechanical type lifting shifter in the preferred embodiment of the present invention.
Figure 9:
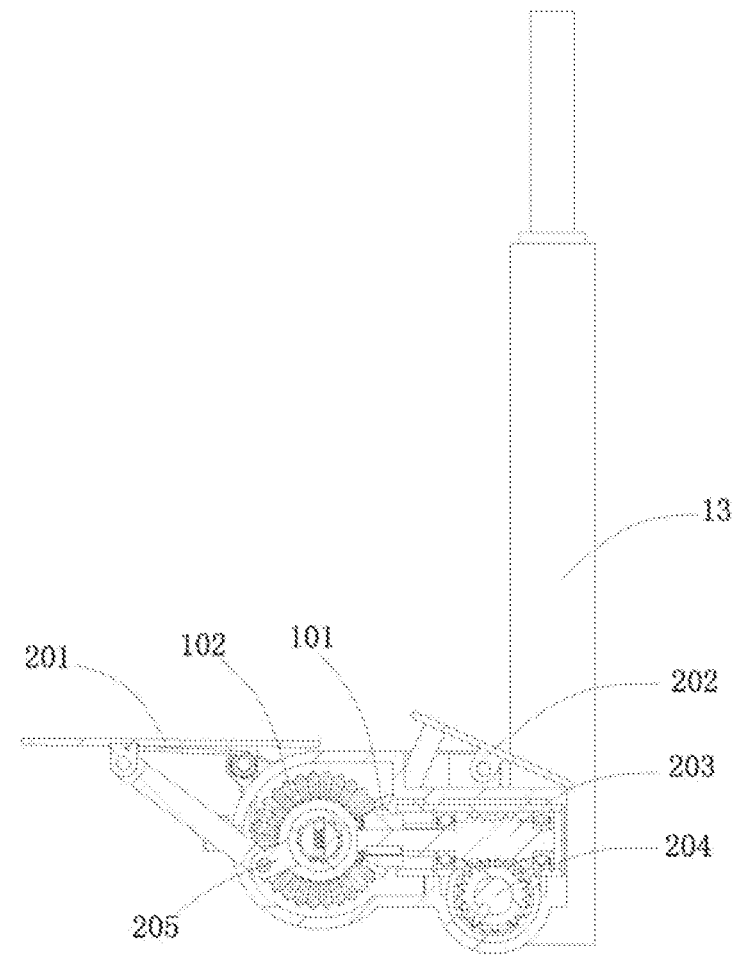
FIG. 9 shows a side view of the pedal transmission assembly and the pedal clutch assembly of the mechanical type lifting shifter in the preferred embodiment of the present invention.
Figure 10:
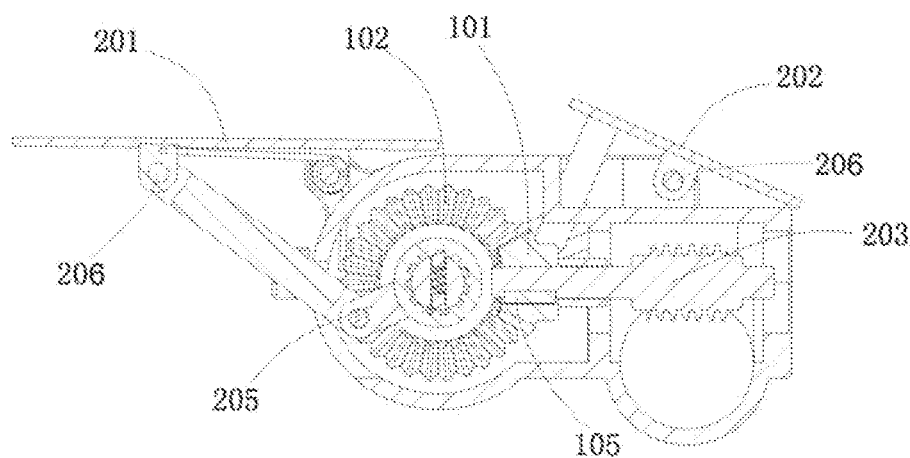
FIG. 10 shows an enlarged view of the partial structure in FIG. 9.
Figure 11:
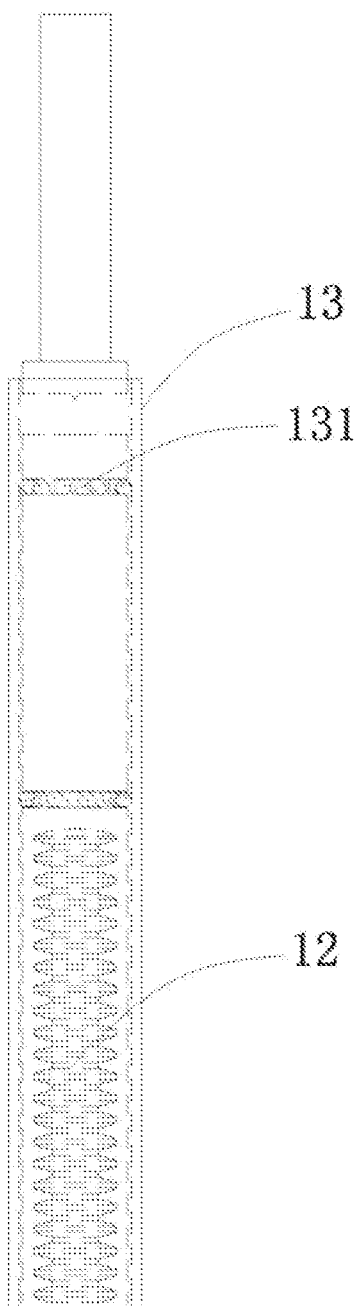
FIG. 11 shows a schematic diagram of the assembly structure of a movable supporting member and a gear rack column of the mechanical type lifting shifter in the preferred embodiment of the present invention.

The pedal transmission assembly 31 comprises:
- a worm-and-gear assembly, comprising a worm 203 and a worm wheel 204; an end portion of the worm 203 is in transmission connection with the worm wheel 204, and the worm wheel 204 is in transmission connection with the rotating shaft 21; more particularly, the worm wheel 204 is co-axially in transmission connection with the rotating shaft 21;
- a bevel gear assembly, comprising a pair of large bevel gears 102 facing towards each other and a small bevel gear 101 arranged between the pair of large bevel gears 102 and meshed with the large bevel gears 102; the small bevel gear 101 is arranged on another end portion of the worm of the worm-and-gear assembly via a first limit key 105;
- a pedal ratchet assembly, comprising a first pedal 201, a ratchet pin 106, a pedal ratchet 103 and a linkage shaft 104; the linkage shaft 104 penetrates a central axis of the pair of large bevel gears 102, and rotations of the linkage shaft 104 and the large bevel gears 102 are independent from each other; the pedal ratchet is fixed on the linkage shaft 104 between the pair of large bevel gears 102 by the ratchet pin 106; the first pedal 201 is in transmission connection with the pedal ratchet 103 to transmit motion to the pedal ratchet 103 to drive the linkage shaft 104 to rotate;

The pedal clutch assembly comprises a second pedal 202 and a pair of connecting mechanisms; each of the pair of connecting mechanisms is arranged on a side of a corresponding large bevel gear 102; the pair of connecting mechanisms is fixed on the linkage shaft 104 via a second limit key 115; the second pedal 202 is in transmission connection with the pair of connecting mechanisms; when stepping on or resetting the second pedal 202, one of the connecting mechanisms on one side is driven to be fixed to the corresponding large bevel gear 102 on the same side, while another one of the connecting mechanisms on another side is disconnected from the corresponding large bevel gear 102 on said another side. When the connecting mechanism on one side is fixedly connected with the large bevel gear 102 on the same side, as the connecting mechanism is fixed on the linkage shaft 104, rotation of the linkage shaft 104 will drive the large bevel gear 102 to rotate through the indirect motion transmission via the connecting mechanism to the large bevel gear 102 on the same side, while the large bevel gear 102 on the other side and the linkage shaft 104 are independently rotatable with respect to each other; as illustrated in FIG. 8, when the connecting mechanism on the left side is fixedly connected to the large bevel gear 102 on the left side, as the connecting mechanism on the left side is fixedly connected to the linkage shaft 104, if the linkage shaft 104 rotates in a clockwise direction (namely a clockwise direction when the structure of FIG. 8 is viewed from the right), the large bevel gear 102 on the left side will be driven to rotate in a clockwise direction, simultaneously the small bevel gear 101 meshed with the large bevel gear 102 will be driven to rotate in an anti-clockwise direction (namely an anti-clockwise direction when the structure in FIG. 8 is viewed from the front); because of the structural design of the two large bevel gears 102 and the small bevel gear 101, the small bevel gear 101 rotating in said anti-clockwise direction will drive the large bevel gear 102 on the right side to rotate in an anti-clockwise direction opposite to a direction which the large bevel gear on the left side rotates; in other words, the rotation directions of the large bevel gear 102 on the left side and the large bevel gear 102 on the right side are opposite to each other; the small bevel gear 101 rotating in the anti-clockwise direction will also drive the worm-and-gear assembly to rotate in an anti-clockwise direction, thereby driving the rotating shaft 21 to rotate in an anti-clockwise direction, and the lifting gears 22 rotates in an anti-clockwise direction to climb down along the gear rack columns 12; on the contrary, when the connecting mechanism on the right side is fixedly connected to the large bevel gear 102 on the right side, as the connecting mechanism on the right side is fixedly connected to the linkage shaft 104, the linkage shaft 104 is driven by the pedal transmission assembly 31 to rotate only in a clockwise direction (namely a clockwise direction of the structure of FIG. 8 when viewed from the right), and thus the large bevel gear 102 on the right side will be driven to rotate in a clockwise direction, thereby driving the small bevel gear 101 meshed with the large bevel gear on the right side to rotate in a clockwise direction (namely the clockwise direction of the structure of FIG. 8 when viewed from the front); because of the structural design of the two large bevel gears 102 and the small bevel gear 101, the small bevel gear 101 rotating in a clockwise direction will drive the large bevel gear 102 on the left side to rotate in an anti-clockwise direction opposite to the direction which the large bevel gear on the right side rotates, in other words, the rotation directions of the large bevel gear 102 on the left side and the large bevel gear 102 on the right side are opposite to each other, the small bevel gear 101 rotating in a clockwise direction simultaneously drives the worm-and-gear assembly to rotate in a clockwise direction, and further drives the rotating shaft 21 to rotate in a clockwise direction, and the lifting gears 22 thus rotate in a clockwise direction to climb up along the gear rack columns 12; when any one of the aforementioned large bevel gears 102 is not fixedly connected to the corresponding connecting mechanism, the large bevel gear 102 and the linkage shaft 104 are independently rotatable, meaning that the large bevel gear 102 will not follow the linkage shaft 104; only when the large bevel gear 102 is fixedly connected with the corresponding connecting mechanism and thus indirectly fixed with the linkage shaft 104, the large bevel rotates in a same direction with the linkage shaft 104; in other words, the connecting mechanism on each side controls the coaxial rotation of the corresponding large bevel gear 102 on the same side and the linkage shaft 104; when the connecting mechanism on one side is fixedly connected with the large bevel gear 102 on the same side, the connecting mechanism on the other side is disconnected from the large bevel gear 102 on the opposite side, and stepping on or resetting the second pedal 202 controls which side of the connecting mechanism is to be connected with the corresponding large bevel gear.

Preferably, the pair of connecting mechanisms each comprises a rotating plate 112, at least a pair of first steel balls 111, a roller bearing 113, and a connecting plate 114, provided on a side of a corresponding large bevel gear 102; wherein the second pedal 202 is in transmission connection with the rotating plate 112, and at least a pair of steel ball grooves is provided on the rotating plate 112; the steel ball grooves on the rotating plate 112 on a side of a corresponding large bevel gear 102 and the steel ball grooves on the rotating plate 112 on a side of another large bevel gear 102 are distributed in mutually staggered positions; the rotating plate 112 is arranged between the first steel balls 111 and the roller bearing 113, and the connecting plate 114 is arranged between the roller bearing 113 and the large bevel gear 102. The second pedal 202 drives both rotating plates 112 of the pair of connecting mechanisms to rotate so that the first steel balls 111 of one of the connecting mechanisms slide into the corresponding steel ball grooves on the rotating plate of said one of the connecting mechanisms and the first steel balls 111 of another one of the connecting mechanisms slide out of the corresponding steel ball grooves on the rotating plate of said another one of the connecting mechanisms; the first steel balls 111 sliding out of the corresponding steel ball grooves abut against the corresponding rotating plate 112 to push the corresponding connecting plate 114 to fixedly connects with a corresponding large bevel gear 102 of the same side, and the connecting plate 114 is coaxially connected and fixed with the linkage shaft 104 to drive the corresponding large bevel gear 102 to rotate with the linkage shaft 104. Specifically, the first steel balls 111 of both connecting mechanisms are fixed at predetermined positions, when the second pedal 202 drives both of the rotating plates 112 to rotate simultaneously, as the steel ball grooves of the rotating plates 112 on both sides are distributed in mutually staggered positions, the first steel balls 111 on one side will slide into the corresponding steel ball grooves of the same side; meanwhile, the first steel balls 111 on another side slide out of the steel ball grooves of said another side, and the first steel balls 111 sliding out of the steel ball grooves abut against the corresponding rotating plate 112 of the same side, so that the rotating plate 112 generates an axial displacement, and the rotating plate 112 pushes the roller bearing 113 while the roller bearing 113 further pushes the connecting plate 114 to be fixedly connected with the corresponding large bevel gear 102 of the same side; the roller bearing 113 and the connecting plate 114 are fixedly locked on the linkage shaft 104 via the second limit key 115, therefore the connecting plate 114 will drive the corresponding large bevel gear 102 of the same side to rotate coaxially with the linkage shaft 104; meanwhile, the first steel balls 111 sliding into the corresponding steel ball grooves on the other side releases the corresponding rotating plate 112 of said another side, and the rotating plate 112 is reset to an initial position, and the roller bearing 113 and the connecting plate 114 of said another side are also reset to the initial position; specifically, a reset spring structure can be adopted to produce the reset process.

In this embodiment, the connecting plate 114 is provided with first toothed profile 116 on an end surface facing to the corresponding large bevel gear 102 of the same side; a corresponding end surface of the large bevel gear 102 of the same side is provided with a corresponding second toothed profile 117; the connecting plate 114 and the corresponding large bevel gear of the same side are engageably connected by the first toothed profile and the second toothed profile, so that the connecting plate 114 is fixedly connected with the corresponding large bevel gear 102 of the same side; at least one reset spring is provided on the end surface of the large bevel gear 102 connected with the connecting plate 114. Certainly, the connection and fixing method between the connecting plate 114 and the large bevel gear 102 can also be other known methods. Preferably, a transmission ratio between the worm wheel 204 and the worm 203 is 1:20, a reference diameter of a gear rack of each gear rack column 12 is 30 mm, and a module of two; since the weight carried by the lifting shifter is relatively large, and therefore, under appropriate conditions, the transmission ratio of the worm wheel to the worm of is 1:20, the reference diameter of the gear rack is 30 mm, and the module is two, so as to correspondingly reduce the output force to reduce the ascending and descending speed of the mechanical type lifting shifter. Furthermore, the worm-and-gear assembly adopts a self-locking structure, which makes the ascending and descending of the mechanical type lifting shifter more controllable. The pedal ratchet 103 is locked on the linkage shaft 104 by a circlip 107. The connecting plate 114 is preferably a manganese steel plate.

The two lifting gears 22 are respectively fixedly arranged on the rotating shaft 21 via a third limit key 23, and operate synchronously with the worm wheel 204. The first pedal 201 and the pedal ratchet 103 are in transmission connection through a linkage rod 205; stepping on the first pedal 201 drives the pedal ratchet 103 to rotate in a single direction, thereby driving the linkage shaft 104 to rotate in a single direction.

More preferably, the first pedal 201 and the second pedal 202 are respectively provided with a reset rotation mechanism 206.

A top portion of each supporting member 11 of this embodiment is provided with a first sliding groove, and a lower end portion of each gear rack column 12 is fixed within the corresponding first sliding groove; at least one second sliding groove is defined above each gear rack column 12 upon sleeving of the gear rack column by the corresponding movable supporting member, and a plurality of second steel balls 131 are provided within the second slide groove; each of the movable supporting members 13 sleeves the corresponding gear rack column 12, and an inner wall of each movable supporting member 13 abuts against the corresponding second steel balls 131. The contact between the second steel balls 131 and the inner walls of the movable supporting members 13 can smoothen the ascending or descending process of the movable supporting members 13 and reduce frictional resistance. The supporting members 11 are in a rectangular cuboidal shape, and rollers are arranged on bottom sides of two end portions of the supporting member 11; and the two supporting members 11 are arranged in parallel; end portions of the gear rack columns 12 are fixed in the first sliding grooves of the bottom supporting assembly and locked with nuts respectively; the second steel balls in the second sliding grooves at another end portions of the gear rack columns abut against the inner walls of the movable upper supporting assembly, thereby acting as sliding rails of the movable upper supporting assembly to stabilize the operation of the movable upper supporting assembly.

Overall, the present invention provides a mechanical type lifting shifter arranged below a wheelchair body, comprising: a bottom supporting assembly arranged below the wheelchair body comprising a pair of oppositely arranged supporting members and gear rack columns vertically arranged on the supporting members respectively; a movable upper supporting assembly comprising a pair of movable supporting members slidably sleeving the gear rack columns respectively; a gear roller assembly, comprising a rotating shaft and a pair of lifting gears respectively arranged on two end portions of the rotating shaft; two ends of the rotating shaft are respectively fixedly connected to and supporting the pair of movable supporting members; the lifting gears are engageably connected to the gear rack columns respectively; a pedal transmission assembly, arranged on the rotating shaft and rotatably connected to the rotating shaft; a pedal clutch assembly, connected to the pedal transmission assembly to switch the clockwise and anti-clockwise motion transmission between the pedal transmission assembly and the rotating shaft. Therefore, the present invention achieves mutual transfer of elderly people with mobility impairments and people with disabilities between wheelchairs and sofas, beds, toilet pans or seats, and solves daily life problems of people with incontinence such as excreting and showering, providing with characteristics of flexibility, convenience, complete functions, safety, reliability, cost-saving and environmental friendliness.

Certainly, the above embodiments are only one of the more preferred specific examples of the present invention, and all modifications and substitutions made by those of ordinary skill in the art in accordance with the essence of the main technical solution of the present invention shall fall within the protection scope of the present invention.

What is claimed is:

1. A mechanical type lifting shifter arranged below a wheelchair body, comprising:
    a bottom supporting assembly, arranged below the wheelchair body, comprising a pair of oppositely arranged supporting members, and gear rack columns vertically arranged respectively on the supporting members;
    a movable upper supporting assembly, comprising a pair of movable supporting members; the movable supporting members slidably sleeve the gear rack columns respectively;
    a gear roller assembly, comprising a rotating shaft and a pair of lifting gears respectively arranged on two end portions of the rotating shaft; two ends of the rotating shaft are fixedly connected to and supporting the pair of movable supporting members respectively; the lifting gears 22 are engageably connected to the gear rack columns respectively;
    a pedal transmission assembly, arranged on the rotating shaft and rotatably connected to the rotating shaft to achieve motion transmission;
    a pedal clutch assembly, connected to the pedal transmission assembly to switch a clockwise and anti-clockwise rotational transmission between the pedal transmission assembly and the rotating shaft.

2. The mechanical type lifting shifter of claim 1; wherein the pedal transmission assembly comprises:
    a worm-and-gear assembly, comprising a worm and a worm wheel; an end portion of the worm is in transmission connection with the worm wheel, and the worm wheel is in transmission connection with the rotating shaft;
    a bevel gear assembly, comprising a pair of large bevel gears facing towards each other and a small bevel gear in a size smaller than the large bevel gears arranged between the pair of large bevel gears and meshed with the large bevel gears; the small bevel gear is arranged on another end portion of the worm of the worm-and-gear assembly via a first limit key;
    a pedal ratchet assembly, comprising a first pedal, a ratchet pin, a pedal ratchet and a linkage shaft; the linkage shaft penetrates a central axis of the pair of large bevel gears, and rotations of the linkage shaft and the large bevel gears are independent from each other; the pedal ratchet is fixed on the linkage shaft between the pair of large bevel gears by the ratchet pin; the first pedal is in transmission connection with the pedal ratchet to transmit motion to the pedal ratchet to drive the linkage shaft to rotate;
    the pedal clutch assembly comprises a second pedal and a pair of connecting mechanisms; each of the pair of connecting mechanisms is arranged on a side of a corresponding large bevel gear, the pair of connecting mechanisms is fixed on the linkage shaft via a second limit key; the second pedal is in transmission connection with the pair of connecting mechanisms; when stepping on or resetting the second pedal, one of the connecting mechanisms on one side is driven to be fixed to the corresponding large bevel gear on the same side, while another one of the connecting mechanisms on another side is disconnected from the corresponding large bevel gear on said another side.

3. The mechanical type lifting shifter of claim 2; wherein the pair of connecting mechanisms each comprises a rotating plate, at least a pair of first steel balls, a roller bearing, and a connecting plate, provided on a side of a corresponding large bevel gear; wherein the second pedal is in transmission connection with the rotating plate, and at least a pair of steel ball grooves is provided on the rotating plate; the steel ball grooves on the rotating plate on a side of a corresponding large bevel gear and the steel ball grooves on the rotating plate on a side of another large bevel gear are distributed in mutually staggered positions; the rotating plate is arranged between the first steel balls and the roller bearing, and the connecting plate is arranged between the roller bearing and the large bevel gear; the second pedal drives both rotating plates of the pair of connecting mechanisms to rotate so that the first steel balls of one of the connecting mechanisms slide into the corresponding steel ball grooves on the rotating plate of said one of the connecting mechanisms and the first steel balls of another one of the connecting mechanisms slide out of the corresponding steel ball grooves on the rotating plate of said another one of the connecting mechanisms; the first steel balls sliding out of the corresponding steel ball grooves abut against the corresponding rotating plate to push the corresponding connecting plate to fixedly connects with a corresponding large bevel gear of the same side, and the connecting plate is coaxially connected and fixed with the linkage shaft to drive the corresponding large bevel gear to rotate with the linkage shaft.

4. The mechanical type lifting shifter of claim 3; wherein the connecting plate is provided with a first toothed profile on an end surface facing to the corresponding large bevel gear of the same side; a corresponding end surface of the large bevel gear of the same side is provided with a corresponding second toothed profile; the connecting plate and the corresponding large bevel gear of the same side are engageably connected by the first toothed profile and the second toothed profile, so that the connecting plate is fixedly connected with the corresponding large bevel gear of the same side; at least one reset spring is provided on the end surface of the large bevel gear connected with the connecting plate.

5. The mechanical type lifting shifter of claim 2; wherein a transmission ratio between the worm wheel and the worm is 1:20, a reference diameter of a gear rack of each gear rack column is 30 mm, and a module is two.

6. The mechanical type lifting shifter of claim 2; wherein the pedal ratchet is locked on the linkage shaft by a circlip.

7. The mechanical type lifting shifter of claim 2; wherein the two lifting gears are respectively fixedly arranged on the rotating shaft via a third limit key, and operate synchronously with the worm wheel.

8. The mechanical type lifting shifter of claim 2; wherein the first pedal and the second pedal are respectively provided with a reset rotation mechanism.

9. The mechanical type lifting shifter of claim 1; wherein a top portion of each supporting member is provided with a first sliding groove, and a lower end portion of each gear rack column is fixed within the corresponding first sliding groove; at least one second sliding groove is defined above each gear rack column upon sleeving of the gear rack column by the corresponding movable supporting member, and a plurality of second steel balls are provided within each second sliding groove; each of the movable supporting members sleeves the corresponding gear rack column, and an inner wall of each movable supporting member abuts against the corresponding second steel balls.

10. The mechanical type lifting shifter of claim 1; wherein the supporting members are in a rectangular cuboidal shape, and rollers are arranged on bottom sides of two end portions of the supporting member; and the two supporting members are arranged in parallel.

* * * * *